US008185537B2

(12) United States Patent
Liang et al.

(10) Patent No.: US 8,185,537 B2
(45) Date of Patent: May 22, 2012

(54) METHOD FOR MONITORING ABNORMAL STATE OF INTERNET INFORMATION (75) Inventors: Xun Liang, Beijing (CN); Hua Chen, Beijing (CN); Jian Yang, Beijing (CN)

(73) Assignee: Peking University, Beijing (CN)

( * ) Notice: Subject to any disclaimer, the term of this patent is extended or adjusted under 35 U.S.C. 154(b) by 54 days.

(21) Appl. No.: 12/525,780

(22) PCT Filed: Apr. 24, 2008

(86) PCT No.: PCT/CN2008/000840
§ 371 (c)(1),
(2), (4) Date: Aug. 23, 2010

(87) PCT Pub. No.: WO2008/128442
PCT Pub. Date: Oct. 30, 2008

(65) Prior Publication Data
US 2011/0191355 A1    Aug. 4, 2011

(30) Foreign Application Priority Data
Apr. 24, 2007 (CN) .......................... 2007 1 0098645

(51) Int. Cl.
G06F 17/30 (2006.01)
(52) U.S. Cl. ...................................................... 707/750
(58) Field of Classification Search .................. None
See application file for complete search history.

(56) References Cited

U.S. PATENT DOCUMENTS

| | | | |
|---|---|---|---|
| 6,397,211 B1 | 5/2002 | Cooper | |
| 6,850,937 B1* | 2/2005 | Hisamitsu et al. | 707/750 |
| 7,941,436 B2* | 5/2011 | Popescul et al. | 707/750 |
| 2003/0033333 A1* | 2/2003 | Nishino et al. | 707/531 |
| 2005/0278613 A1* | 12/2005 | Morinaga et al. | 715/500 |
| 2006/0004732 A1* | 1/2006 | Odom | 707/3 |
| 2006/0047617 A1* | 3/2006 | Bacioiu et al. | 706/59 |

FOREIGN PATENT DOCUMENTS

JP        2002-245061 A        8/2002

OTHER PUBLICATIONS

International Search Report of PCT/CN2008/000840, dated Jul. 3, 2008.
Liang "Research on Stock Volatility Based in Web Statistic Information Mining." Microcomputer Development, vol. 15, No. 8, Aug. 2005, pp. 81-84. Liu "Research on Personalized News Search System." Journal of Zhejiang Wanli University, vol. 18 No. 4, Aug. 2005, pp. 32-34, 43.
Mo et al. "Design and Implementation of Topic News information Portal System." Computer Engineering, vol. 32, No. 10, May 2006, pp. 265-267.
Luo et al. "Research on Fast Text Classifier Based on New Keywords Extraction Method." Application Research of Computers, No. 4, 2006, pp. 32-34.

* cited by examiner

Primary Examiner — Belinda Xue
(74) Attorney, Agent, or Firm — SV Patent Service (57) ABSTRACT

The present application discloses a method for monitoring abnormal state of Internet information. The method includes obtaining frequency data for current date common words appearing on the current date web pages, combining with a hot words dictionary that Internet users focuses on to determine a list of current date keywords related to the Internet information, determining a weight of each current date keyword, determining an abnormal threshold of the current date keywords, and detecting an abnormal level of the current date keywords to determine current date hot Internet information. The disclose method further calculates an abnormal level of keywords by monitoring the change in the hot words frequency in the Internet information, and generates warning for the abnormal level of hot words frequency change, which allows the Internet users to respond at the first moment.

5 Claims, 4 Drawing Sheets

METHOD FOR MONITORING ABNORMAL STATE OF INTERNET INFORMATION

TECHNOLOGY FIELD

This invention belongs to the technology field of Internet information mining and, concerning the method of tracing and monitoring the abnormal level of Internet information specifically.

BACKGROUND TECHNOLOGY

As Internet increasingly grows into the major medium for people to release and exchange information, the focus as well as hot social issues that people attend can be better reflected through the Internet information. Therefore, it has become an understandable demand to monitor the hot issues and focus incidents reflected in Internet information. Both common users and professionals expect an automatic tool or a method to assist their real-time tracking of latest and hottest issues or news in the fields they are interested in, so that they can grasp the latest development in these fields.

It is not difficult noticing that in most cases, the concentrated and intensive emergence of some keywords in Internet information corresponds to the occurrence of some hot news or focus incident, while the massive text containing related keyword will emerge in Internet intensively once extensively attended news or incidents occur. Therefore, great change in the amount of hot keywords in Internet generally reflects occurrence or cool-down of hot social news or incidents, and Internet text reflecting hot social news or incidents will in turn promote vast Netizens' interests and opinions in relevant news and incidents. In other words, exceptionally high frequency of keywords is somewhat related to significantly hot news and incidents. Therefore, prediction of issues with less change in keyword frequency is avoided in this invention; instead, only exceptionally high frequency changes of keywords are concerned. This invention is a very valuable tool for Internet survey institution as well as institution laying focus on hot social news and incidents to trace the emergence frequency of hot words automatically.

All words involved in the method discussed here refer to keywords in Internet information.

Different words have different emergence frequencies, while words with different emergence frequencies but an identical emergence frequency on a specific day connote different meanings. For a frequently used word, both the historical average and the historical standard deviation of its emergence frequency are significant (for instance, they are 500 times per day and 350 times per day, respectively). If its emergence frequency on Internet is increased by 300 times on some day and becomes 800 times, i.e., almost doubled, then it is still regarded as normal; however, if its emergence on Internet becomes 1200 times, i.e., almost doubled, then it may indicate occurrence of corresponding hot news or incidents.

For a word used less frequently, its daily emergence frequency on Internet and standard deviation are low. For instance, they are 20 times and 15 times, respectively. If on one day, its emergence frequency on Internet is increased by 30 times and becomes 50 times, i.e., almost doubled, then it is generally regarded as still normal; however, if its information amount on Internet on some day is increased by 300 and becomes 320, then it indicates occurrence of corresponding hot incidents or news.

In other words, the same increment of 300 times is normal for high-frequency words yet indicates occurrence of abnormal incidents for low-frequency words, i.e., the criteria for determining words with different emergence frequencies are different.

For low-frequency words, the above emergence frequency (300 times) is known as an unusually high increment of word frequency. The main aim of this invention is to monitor the unusually high increment of word frequency and in turn predict the occurrence or cool-down of hot-spot information in Internet as well as send alarm if necessary.

Khoo K. B. et al. brought forward a method to trace hot issues in 2001. They made periodical Stat. on the emergence frequency of some terms in some fixed-point websites or web pages and obtained hot issues at that time by calculating the weight of each term at that time based on Formula tfidf (Khoo K. B., Mitsuru I. Emerging Topic Tracking System. Advanced Issues of E-Commerce and Web-Based Information Systems, WECWIS 2001, Third International Workshop on. Feb. 11, 2001.), hereafter referred as existing technology 1. Its contribution lies in that it provides a standard formula to calculate the current weight of each term, and such a weight will change with time and reflect the variation of hot spots in Internet information. Its main drawbacks lie in that the historical average and the historical standard deviation of each term are not considered, so abnormal hot spots cannot be determined accurately based on the historical records of high-frequency words and low-frequency words; instead, only transverse comparison can be performed on each term.

SUMMARY OF INVENTION

The purpose of this invention is to provide a method to monitor the variation in the emergence frequency of a hot word in Internet information, so as to perform abnormal state monitoring on Internet information.

The technological scheme of this invention is as follows:

A method to perform abnormal state monitoring on Internet information, with which abnormal states in Internet information are monitored based on a dictionary of hot words that users have interest in. It includes following steps:

I. Current date word-frequency data of common words emerged on Internet web pages are acquired and stored in database.

Periodical mining is performed on Internet web pages to obtain the word frequency of each common word in each web page; the word frequencies of a common word in all web pages are accumulated to obtain the current date word-frequency data of the common word in the current date Internet information, which is then stored in database. The process can proceed as follows:

(1.1) Lists of Internet websites to be mined are determined and stored in database;

(1.2) Each record in the website lists in database is iterated, and the emergence frequency of each common word in a website is obtained based on the following method: the chained addresses of web pages to be mined are obtained according to the records in website lists and the general-word dictionary; information concerning each common word and marked with date information is picked out based on the chained addresses to be mined, and such information is counted;

(1.3) The emergence frequencies of each common word in all website lists in database are accumulated to obtain the current date frequency data of the common word, which again are stored to the original location in database.

According to the above steps, the current date frequency data of all common words can be mined and calculated. It is worth noting that relatively long period is needed to accumulate the above historical data based on the above method in order to apply this method.

After historical data are acquired, the variation of word frequency in the coming day can be tested. Firstly, Chinese segmentation is performed on each current date web-page document based on Chinese segmentation method to obtain all common words emerged in the web page (segmentation can be performed based on existing mature dictionary for Chinese segmentation, e.g., the massive Dictionary of Institute of Computing Technology, Chinese Academy of Sciences).

II. The current date keywords in each web page are determined based on users-attended hot-word dictionary. The current date keywords in all web pages are merged to obtain a set of the current date keywords in Internet information ({ti i=1 ... M}, where M is the keyword number in the current date keyword list).

The method to determine current date keywords in each web page can be as follows:

(2.1) For each common word in each web page, the characteristic, value of its information (tfidf) is calculated based on following Formula: tfidf=−[freq(p,D)/size(D)]*[log(df(p)/N)], where freq(p, D) is the number of common word p emerged in web page D, size(D) is the number of all common words contained in D, df(p) is the number of articles containing common word p in the current date web-page set, and N is the number of web pages in the current date web-page set.

(2.2) All common words in a web page are compared with the users-attended hot-word dictionary, and those hot words beyond users' focus are deleted to form an alternative keyword list specifically for this web page. Number K of keywords in this alternative keyword list with greater tfidf is chosen to obtain the current date keywords of this web page, where K is a positive integer.

III. Weights of current date keywords are determined.

In the web-page set picked on the very day, all keywords in the current date keyword set are accumulated and summed to count the current date frequency of each keyword, and all current date keywords are sorted in ascending order according to the current date word frequency.

According to historical data of each keyword's emergence in Internet, historical average $\mu i$ and historical fluctuation rate $\sigma i$ (the fluctuation rate in this invention is defined as the absolute value of word-frequency variation rate, without reference to frequency fluctuation, i.e., the fluctuation rate is always positive).

Afterwards, the weights of keywords are calculated: value q of keyword ti is defined as the round-up reciprocal of the fluctuation rate, i.e., $qi=1/(cein(\sigma i))$, where i=1, ..., M, and cein( ) is the round-up function. Thus, the weight wi of keyword ti satisfies:

$$wi = q_i \Big/ \sum_{i=1}^{M} q_i,$$

and i=1 corresponds to the current date keyword with the lowest current date word frequency fi.

IV. Abnormal threshold values of current date keywords are determined

For a current date keyword ti, its abnormal threshold value is defined as $\sigma i'=\sigma i+c$ (wi/w1), where i=1, ..., M, and c is a constant and can be defined by users according to their experiences, representing the expansion of abnormal threshold.

For an unfrequent word ti, $\sigma i' \approx \sigma i+c$ since $\sigma i \approx \sigma 1$; for the most common word, its $\sigma i$ is larger, so $\sigma i' \approx \sigma i$; for a common word, its abnormal threshold transits smoothly between $\sigma i$ and $\sigma i+c$.

V. Abnormal levels of current date keywords are checked, and current date hot Internet information is determined:

The offset degree of current date keyword is defined as $\theta i'=(fi-\mu i)/\sigma i'$, and the Internet information containing the current date keywords with larger offset degrees is the current date hot Internet information.

Furthermore, the above method includes the following steps:

VI. The abnormal level $\theta i$ of each keyword is checked based on the fold-line discriminant function shown in FIG. 4 (round operation needed). In other words, $\theta i=0$ when $-\infty < \theta i'<0$; $\theta i=$floor$(100 \theta i')$ when $0 \leq \theta i'<1$, where floor( ) is the round-down function; when $1 \leq \theta i'<2$, $\theta i=$floor$(80(\theta i'-1))+10$; when $2 \leq \theta i'<3$, $\theta i=$floor$(9(\theta i'-2))+90$; when $3 \leq \theta i'<+\infty$, $\theta i=99$. When the abnormal level $\theta i$ of keyword ti is greater than 90, it is regarded that abnormal change occurs in this keyword, and the Internet information containing the keyword becomes the emergency hot-issue information on that day.

Figure 2:
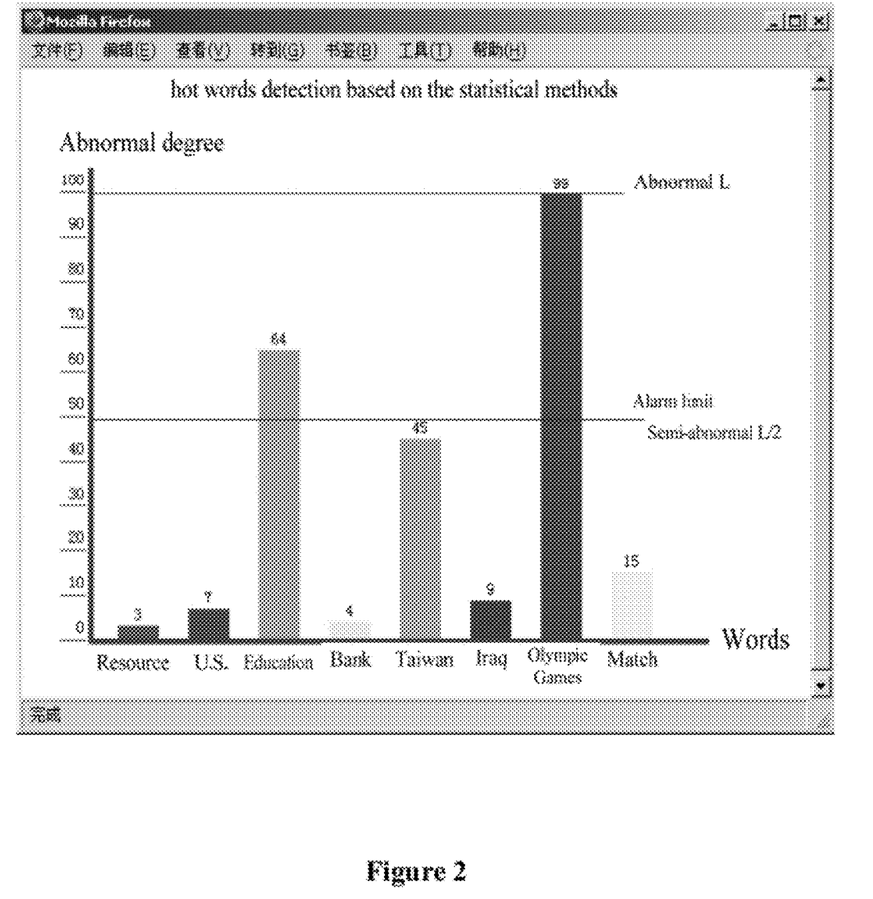
FIG. 2 Example of graphical display and alarm of prediction results of hot-spot abnormal levels based on word frequency variation in Internet.

Furthermore, the above method includes the following steps:

VII. The abnormality scores of all keywords are displayed graphically, as shown in FIG. 2, so that users can observe the scores easily. The graphical form is as follows:

The results of step 6 are drawn for users based on Java Applet and Java AWT as well as the coordinates of each hot word on canvas and the predicted abnormal level of word frequency. The longer a graphical bar is, the greater the abnormal level of the word frequency on Internet becomes. The method to determine the color of graphical bar is the color to be drawn is determined based on bar length and by means of inquiring a table in which twenty lengths correspond to twenty colors one to one (see FIG. 2).

The lengths and colors of graphical bars transit gradually:

<7.1> from length zero and bottle green (corresponding to word-frequency abnormal level zero) to <7.2> length L/2 and orange (corresponding to word-frequency abnormal level 90) to <7.3> length L and scarlet (corresponding to word-frequency abnormal level 100).

Where the maximum bar length is L; moreover, in order to highlight abnormal keywords, the bar length and the abnormality score of a keyword are in negatively logarithmic relation rather than proportional, i.e., $l_i=(2-\log(100-\theta i))$ L/2, where log is a logarithmic function with 10 as the base. Thus, the highest score 99 corresponds to length L, abnormal threshold value 90 corresponds to length L/2, and abnormal level 0 corresponds to length 0.

In order to remind users in due time, the above method includes the following steps:

When the abnormal level $\theta i$ of current date keyword ti is greater than 90, alarm is sent to users. In other words, when the bar length exceeds or equals to L/2 (while the color becomes redder, e.g., scarlet and orange), i.e., reaching or exceeding the alarm line, and the system alarm to users.

The difference of this invention with existing technology 1 is exhibited in three aspects:

Firstly, Formula tfidf is adopted in existing technology 1 to determine the importance degree of keywords, while the historical average and the standard deviation of each word is not taken into account, nor there is a mechanism to treat different situations of high-frequency words and low-frequency words; apart from Formula tfidf being adopted in this invention to choose current date keywords, a formula to determine the weight of variation in words with different frequencies is designed. Historical average and historical standard deviation are adopted to predict significant fluctuation of word frequency. Since the abnormal inclination of each keyword depends largely on its frequency distribution in history, the practical application effect of keyword abnormal-level test can be improved fundamentally through the adoption of historical average and standard deviation.

Secondly, as for the changes in hot issues represented by the variation in word frequency, it is illustrated by the arrangement of word weights in existing technology 1, while abnormality, semi-abnormality and normality are adopted in this invention as the criteria for determination. The abnormal level is calculated based on the degree of current date word frequency deviating from historical average; as for threshold judgement, high-frequency words and low-frequency words should be differentiated apart from laying foundation on historical standard deviation. Thus, abstract variation of hot spots is specified and becomes more close to actual situations.

Thirdly, there is no graphical display in existing technology 1, which is unfavorable to application; in the method of this invention, graphical bars and color display are further designed and implemented, and an approach to express the fluctuation rate of word frequency visually as well as an alarm function are provided.

In this invention, the abnormal level of the frequency variation of hot words is predicted and alarmed by means of monitoring the variation in the emergence frequency of hot words in Internet information and calculating the abnormal levels of keywords. For Internet supervisory administration, this invention can provide a timely window for hot-spot information observation to detect those incidents showing signs of abnormality as early as possible, and can strengthen vigilance against great fluctuation in the frequency of hot words so as to make response instantly'. Besides, based on this method, the variation in hot-spot information and incidents can be predicted from Internet, and alarm can be sent to users quite accurately. Since the information on Internet is generally massive, the graphical output form of the invention essentially provides a kind of summary information so that the efficiency of hot-spot information detection can be improved. For instance, if the hot-spot information concerns stock market, the influence of the variations in macro-economic indications and corporate finance on share price can be learned indirectly, and more theoretical evidence can be provided for policy making by policy-making agency. With the development and pervasion of Internet, more financial information will be released through the channel of Internet, while Internet may very possibly become an edge tool to market speculators due to its extensity and anonymity. In this sense, research on the hot-spot financial information on Internet is helpful for financial supervisory institution to realize effective financial regulation, improve information credibility, and crack down malicious operation. For corporate administrators, if the possible influence of financial information on Internet on their activities in stock market can be grasped beforehand, they surely can make decisions more effectively and respond to fake and speculating financial information in due time.

CONCRETE IMPLEMENTATION METHOD

Here describe a detailed instance of this invention.

Figure 1:
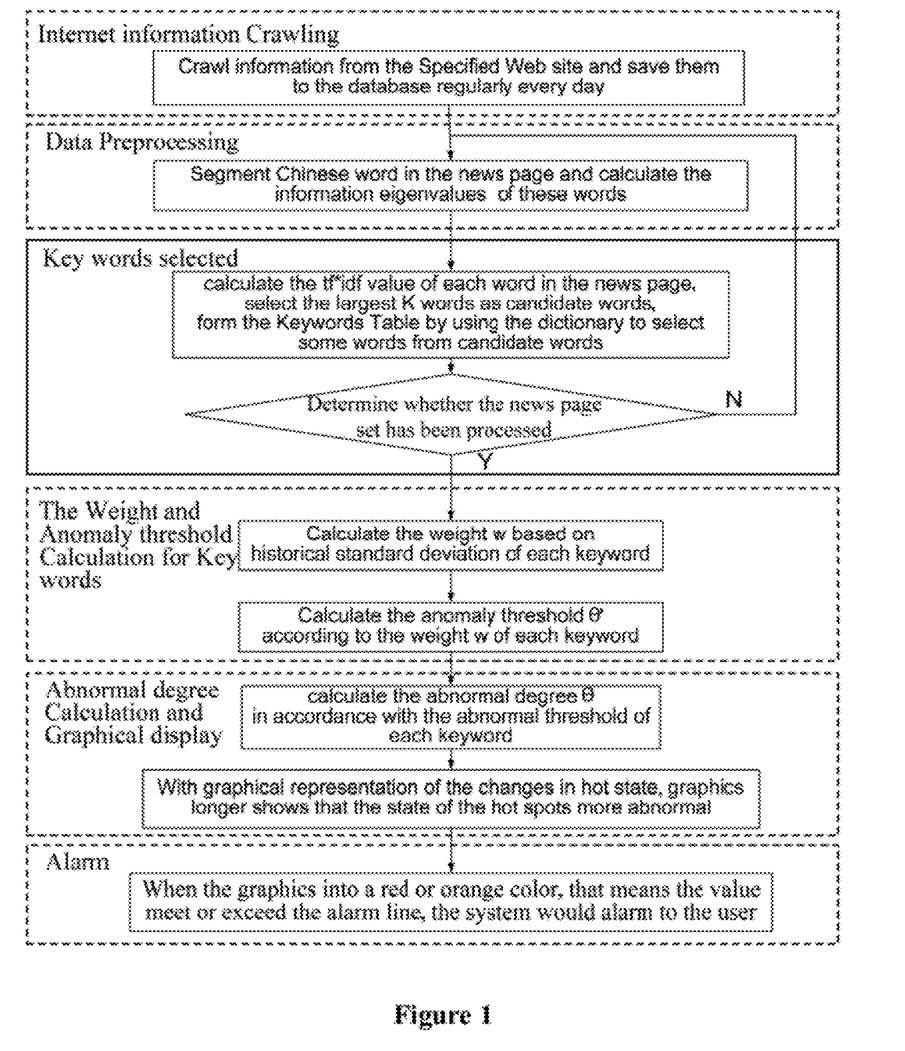
FIG. 1 Flow chart of main steps of invention method.

As shown in FIG. 1, a method of monitoring the abnormal state of Internet information, with which abnormal state monitoring is performed on users-attended Internet information based on users-attended hot-word dictionary. The method includes the following steps:

(1) Text Mining of Current Date Internet News

<1> Website lists to be mined are provided and stored in database. Table 1 provides a part of them.

TABLE 1

Sample list of Internet news websites

| SN | Chained address |
|---|---|
| 1 | http://news.sina.com.cn/ |
| 2 | http://news.163.com/ |
| 3 | http://cn.news.yahoo.com/ |
| 4 | http://news.sohu.com/ |
| 5 | http://news.tom.com/ |
| 6 | http://sounews.ynet.com/shishi/shishi_class.htm |
| 7 | http://tv.pchome.net/ |
| 8 | http://www.enet.com.cn/enews/ |
| 9 | http://www.enet.com.cn/enews/ |
| 10 | http://news.chinabyte.com/ |
| 11 | http://www.gov.cn/jrzg/zgyw.htm |
| 12 | http://news.hexun.com/ |
| 13 | http://news.china.com/ |
| 14 | http://msn.ynet.com/ |
| 15 | http://www.zaobao.com.sg/ |
| 16 | http://www.xinhua.org/ |
| 17 | http://www.people.com.cn/ |
| 18 | http://www.ce.cn/xwzx/ |
| 19 | http://www.cet.com.cn/ |
| 20 | http://news.cctv.com/index.shtml |

<2> Get a record from the website lists in database, e.g., http://news.sina.com.cn/.

Figure 3:
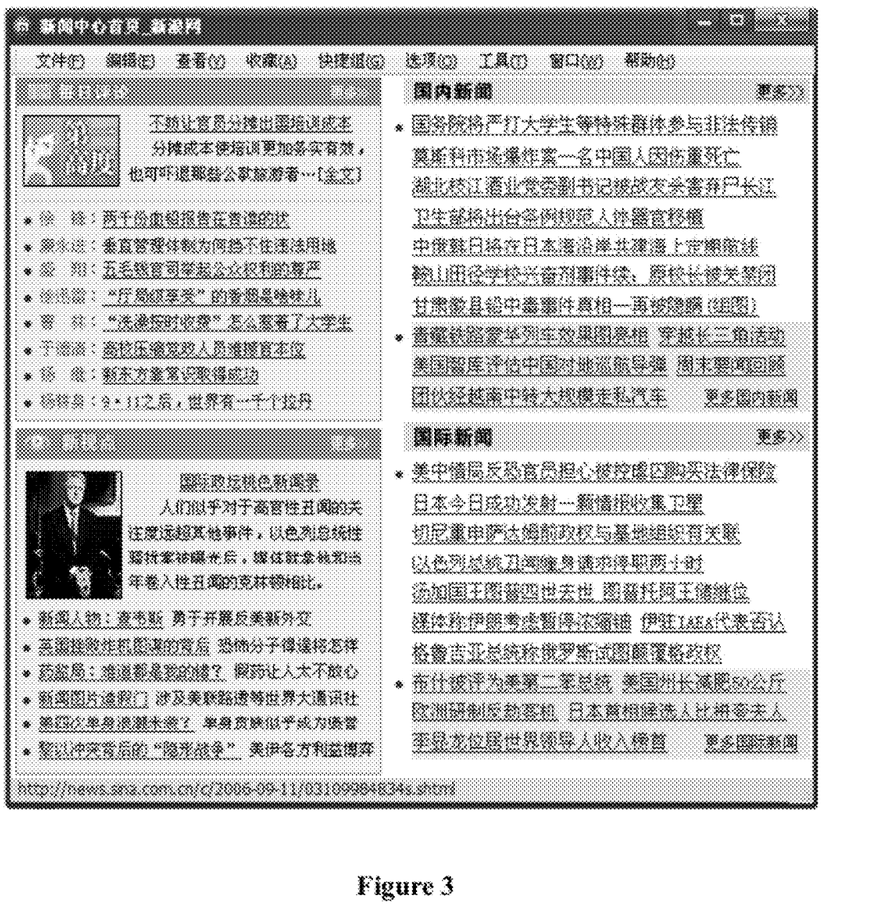
FIG. 3 Information of news pages in SINA.com on Sep. 11, 2006.

<3> According to chained addresses to be mined, information marked with dates (e.g., 2005 Dec. 6) is picked out and counted (if necessary, webpage links marked with "more" can be accessed to find all current date information). The instance is shown in FIG. 3;

<4> A dictionary of users' hot words is generated (Table 2 provides some, and the scale depends on users), and the historical average and the historical variance of word frequency corresponding to each hot word are provided.

<5> For each web page, the frequency of each hot word emerged in the dictionary is calculated. It is added to the word frequency calculated in the web pages already mined previously, and stored in the original location in database.

Following the above steps, the current date frequencies of all hot words can be mined and calculated.

In this instance, the news data on Internet from the end of 2003 to the end of 2004 are adopted.

Rather than limited to mining Internet news text, this invention is capable of mining any text that can reflect hot-spot information, e.g., forum text.

(2) Data Preprocessing

After historical data are obtained as mentioned above, the abnormal state of current date keywords can be monitored. Firstly, Chinese segmentation is performed on each current date web-page document based on Chinese segmentation method and segmentation dictionary (e.g., the massive Dictionary of Institute of Computing Technology, Chinese Academy of Sciences) to obtain common words in a web page. For each common word, its characteristic value tfidf is calculated, i.e., tfidf=−freq(p,D)/size(D)*log(df(p)/N), where freq(p, D) is the frequency of word p emerged in web page D, size(D) is the number of all common words contained in web page D, df(p) is the number of articles in the current date web-page set that contains common word p, and N is the number of web pages in the current date web-page set.

(3) Automatic Selection of Keywords

All common words mined in current date web pages are sorted in ascending order according to their tfidf values and then, referred to the hot-word dictionary defined by users. The words not existing in the users' dictionary are deleted, and thus, an alternative keyword list is formed. Afterwards, by reference to the alternative keyword list, ten keywords with the largest tfidf values are picked out from each current date mined web-page document and merged to obtain a set of current date keywords, as shown in Table 2.

According to the historical frequency data of each keyword in Internet, historical average $\mu i$ and historical fluctuation rate $\sigma i$ are calculated (the fluctuation rate is defined as the absolute value of word-frequency variation rate, without reference to frequency fluctuation, i.e., the fluctuation rate is always positive). Afterwards, keyword weight is calculated, The weight $wi$ of keyword $ti$ satisfies:

$$wi = q_i \Big/ \sum_{i=1}^{M} q_i,$$

where $qi=1/(cein(\sigma i))$, $i=1, \ldots, M$, and $cein()$ is the round-up function (see Table 3).

(5) Abnormal Threshold Calculation of Keyword

For keyword $ti$, its abnormal threshold $\sigma i'=\sigma i+c$ $(wi/w1)$ is calculated, where $i=1, \ldots, M$. Here the default constant c is 15 and is given according to users' experience, representing the expansion of abnormal threshold of a word.

It can be seen that for an unfrequent word $ti$, $\sigma i' \approx \sigma i+c$; for the most frequent words, $\sigma i' \sigma i$; for common words, their abnormal threshold values transit smoothly between $\sigma i$ and $\sigma i+c$(see Table 3).

(6) Abnormal Level Detection and Graphical Display of Keywords

The offset degree of keyword $\theta i'$ is calculated as $(fi-\mu i)/\sigma i'$, where $i=1, \ldots, M$.

TABLE 1

Keyword list of Aug. 16, 2004

| term | Iraq | Explosion | U.S. army | ... | Education | resource | Olympics | Taiwan | Bank |
|---|---|---|---|---|---|---|---|---|---|
| tf*idf value | .015672 | .012761 | .008559 | ... | .005939 | .005932 | .005596 | .004896 | .004132 |

(4) Weight Calculation of Keyword

In the current date mined web-page set, all keywords in the current date keyword set are accumulated and summed to count the current date word frequency $fi$ for each keyword, and all current date keywords are sorted in ascending order based on current date word frequency. For the convenience of weight calculation according to the sequence of word frequency, $fi$ is the lowest when $i=1$.

Figure 4:
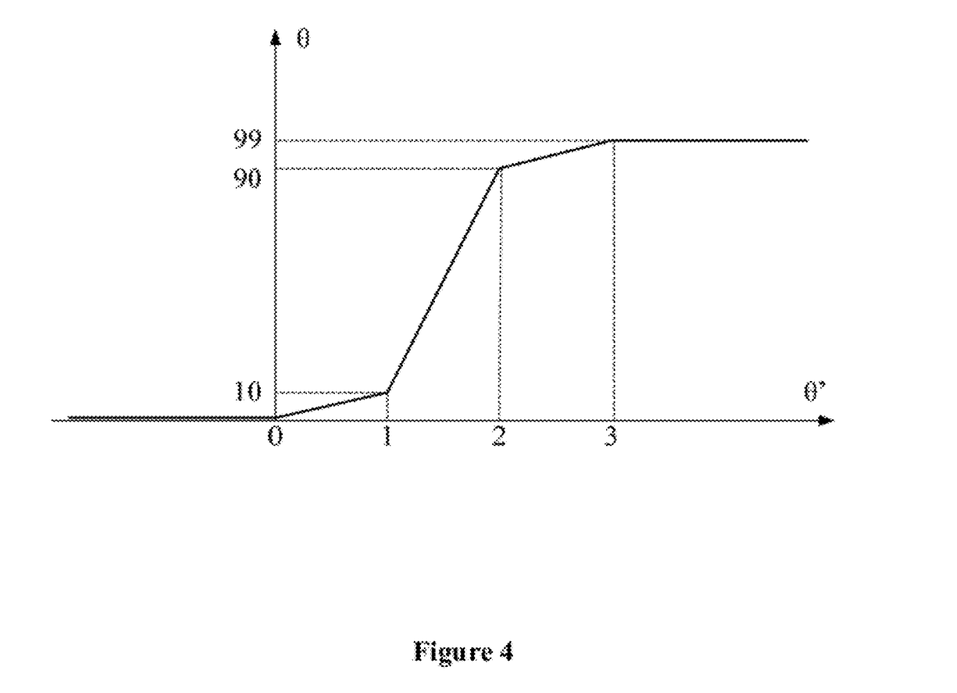
FIG. 4 Fold-line function chart for judging abnormal levels.

Then, the abnormal level $\theta i$ of each keyword is determined based on the fold-line function shown in FIG. 4. The results are shown in Table 3.

Finally, keywords with abnormal scores above 90 are regarded as having undergone abnormal changes. Meanwhile, the abnormal scores of all keywords can be displayed in the graphic form shown in FIG. 2 on that users can observe their scores easily.

TABLE 2

Attributes and abnormal level indices of keywords on Aug. 16, 2004

| Term | current date word frequency | Historical average | Historical variance | Weight | Abnormal threshold value | Offset degree | Abnormal level |
|---|---|---|---|---|---|---|---|
| Iraq | 108 | 72.75 | 36.99097 | 0.005504 | 46.99097 | 0.750144 | 7 |
| Explosion | 2 | 21.6 | 15.93542 | 0.012727 | 39.06042 | −0.50179 | 0 |
| US army | 60 | 34.9 | 20.70418 | 0.009697 | 38.32323 | 0.654955 | 6 |
| ... | ... | ... | ... | ... | ... | ... | ... |
| Education | 101 | 37.2 | 16.14899 | 0.011979 | 37.9137 | 1.682769 | 64 |
| Resource | 37 | 22.8 | 17.08389 | 0.011313 | 37.63945 | 0.377264 | 3 |
| Olympics | 160 | 41.375 | 25.09189 | 0.007832 | 39.32266 | 3.016708 | 99 |
| Food | 19 | 9 | 12.729 | 0.015665 | 41.19053 | 0.242774 | 2 |
| Taiwan | 105 | 46.45 | 27.32155 | 0.007273 | 40.53584 | 1.444401 | 45 |
| Bank | 43 | 24.9 | 24.92628 | 0.008146 | 39.72628 | 0.455618 | 4 |
| Loan | 27 | 9.45 | 8.173518 | 0.022627 | 49.28463 | 0.356095 | 3 |
| Western area | 19 | 8.25 | 6.796552 | 0.029091 | 59.65369 | 0.180207 | 1 |
| University entrance examination | 19 | 5.95 | 6.984899 | 0.029091 | 59.84204 | 0.218074 | 2 |
| ... | ... | ... | ... | ... | ... | ... | ... |
| China team | 21 | 25.05 | 28.95143 | 0.007022 | 41.71005 | −0.0971 | 0 |
| match | 116 | 52.4 | 52.48914 | 0.003842 | 59.47027 | 1.069442 | 15 |

Based on the graphical form shown in FIG. 2, the color that should be painted is determined according to the length of graphical bar and through inquisition of a table in which twenty lengths correspond to twenty colors one to one. Graphical bar represents the abnormal level of a keyword: the longer a graphical bar is, the greater the abnormality of the word frequency on Internet becomes.

From the figure, it can be seen that keyword Olympics underwent significant abnormal variation and became scarlet; keyword education also changed abnormally and became orange; despite its high absolute frequency, keyword Iraq is not regarded as undergoing abnormal change due to less change in its frequency, which did not exceed the threshold value.

(7) Alarm

When the length of a graphical bar exceeds or equals to L/2 (when the color trends redder, e.g., scarlet and orange), i.e., reaching or exceeding the alarm line, the system will alarm to users.

Validity Evaluation for this Invention:

A test set is adopted in this invention to evaluate the validity of this invention. This set is sampled from news and information in portals. In order to demonstrate the comprehensive situation of keyword abnormality in focus incidents, the incidents chosen cover various areas.

As for whether the hot words chosen for evaluation are proper as well as how about the correctness of these hot words, a reference criterion is needed, but there is no such an objective and comprehensive criterion for evaluation. Accordingly, this invention is implemented based on the information distribution in these portals, and a reference list of hot words is determined manually beforehand, for the hot-word list also change continuously with time and may change each day.

Currently in the field of information retrieval, the most frequently adopted indications for evaluating word mining performance are Recall rate and Precision rate, which are adopted for validity evaluation in this invention and defined as:

*P*=(Number of obtained satisfactory hot words)/(Total number of obtained words)

*R*=(Number of obtained satisfactory hot words)/ (Number of words in hot-word list)

The two indications depict the performance from different perspectives.

The first step of test is to acquire data set. The time range of documents is from Aug. 1, 2004 to Aug. 16, 2004, and the chosen sites are from the websites listed in the above Table 1.

Web-page data were acquired based on the introduced first method step of the invention and stored locally for further evaluation. Details of test document set can be found in Appendix 4, in which the number of successfully obtained articles, word number and document size are listed. Along with data acquisition, Chinese segmentation was performed on the documents based on the massive Dictionary of Institute of Computing Technology, Chinese Academy of Sciences, and the following Stat. calculation is the result of segmentation.

TABLE 3

Test set from Aug. 1, 2004 to Aug. 16, 2004

| Date | Document number | Set size | Total number of words used | Total word number after repeated words are dropped |
|---|---|---|---|---|
| 20040801 | 242 | 302,582 bytes | 72141 | 10289 |
| 20040802 | 311 | 586,180 bytes | 143316 | 14812 |
| 20040803 | 195 | 374,591 bytes | 91595 | 11027 |
| 20040804 | 332 | 671,684 bytes | 162834 | 15998 |
| 20040805 | 207 | 385,729 bytes | 92733 | 11383 |
| 20040806 | 305 | 595,104 bytes | 144207 | 15074 |
| 20040807 | 283 | 447,607 bytes | 107764 | 12694 |
| 20040808 | 269 | 428,878 bytes | 103720 | 12893 |
| 20040809 | 367 | 762,034 bytes | 186284 | 17163 |
| 20040810 | 344 | 670,417 bytes | 161539 | 16075 |
| 20040811 | 359 | 627,811 bytes | 152953 | 15242 |
| 20040812 | 357 | 684,667 bytes | 166526 | 16451 |
| 20040813 | 348 | 600,706 bytes | 145480 | 15381 |
| 20040814 | 317 | 490,444 bytes | 118125 | 13032 |
| 20040815 | 320 | 495,136 bytes | 119087 | 14192 |
| 20040816 | 360 | 706,954 bytes | 170695 | 16486 |

Abnormal levels obtained by detection of the keywords during this time are shown in the Table 5. The abnormal levels on a specified day are dependent upon the historical word frequency and fluctuations.

TABLE 5

Abnormal levels of some keywords from Aug. 1 to 16, 2004

| | Iraq | explosion | American troops | education | bank | ... | Olympic Games | terror | resources | Taiwan |
|---|---|---|---|---|---|---|---|---|---|---|
| 20040801 | 99 | 68 | 25 | 3 | 0 | — | 0 | 2 | 1 | 0 |
| 20040802 | 93 | 20 | 25 | 6 | 3 | ... | 0 | 4 | 3 | 6 |
| 20040803 | 7 | 0 | 28 | 7 | 1 | ... | 0 | 5 | 3 | 62 |
| 20040804 | 95 | 6 | 7 | 86 | 82 | ... | 90 | 4 | 45 | 95 |
| 20040805 | 3 | 1 | 3 | 4 | 0 | ... | 9 | 5 | 7 | 1 |
| 20040806 | 24 | 2 | 5 | 29 | 1 | ... | 5 | 96 | 7 | 30 |
| 20040807 | 93 | 6 | 49 | 63 | 72 | ... | 2 | 5 | 2 | 14 |
| 20040808 | 92 | 3 | 7 | 2 | 4 | ... | 2 | 15 | 1 | 26 |
| 20040809 | 66 | 8 | 16 | 59 | 2 | ... | 99 | 21 | 59 | 6 |
| 20040810 | 17 | 0 | 0 | 78 | 1 | ... | 92 | 3 | 5 | 93 |
| 20040811 | 3 | 4 | 5 | 9 | 3 | ... | 7 | 2 | 5 | 33 |
| 20040812 | 87 | 9 | 95 | 41 | | ... | 86 | 8 | 3 | 94 |
| 20040813 | 4 | 7 | 1 | 7 | 99 | ... | 99 | 8 | 1 | 90 |
| 20040814 | 0 | 0 | 6 | 0 | 0 | ... | 96 | 2 | 1 | 0 |
| 20040815 | 82 | 0 | 32 | 0 | 0 | ... | 91 | 5 | 0 | 0 |
| 20040816 | 7 | 0 | 6 | 64 | 4 | ... | 99 | 0 | 3 | 45 |

In the Table 5, the abnormal levels on the specified day during the time vary with the historical averages and variances of the corresponding word frequency. During the period of time, the relationship between the abnormal changes of the hot words and the historical averages and variances is observed. Take the data of abnormal levels on the previous day of the test document as an example. On the basis of unprecedented historical averages and variances, the data of abnormal levels on the specified day is not likely to explain anything. On the basis of the tf*idf value simply, more hot words on the specified day are embodied by the word frequency itself. Higher word frequency, such as "Iraq", the abnormal level is 99, while the number of the word frequency is 155 on the same day, accounting for a great proportion, which explains the great occurrence number on that day only. After one week, the word frequency for "Iraq" 145 also seems great, but the abnormal level is only 66, not reaching abnormal alarm limit.

Words with low word frequency usually, such as "Olympic Games", the abnormal level is 0 in the data of the test documents on the first day, and the number of word frequency 8 is low as well. But after three days, although the word frequency is 67 only, the abnormal level has reached 90 already. This is caused by great fluctuation rate of the historical data of the word frequency. And the conformity with the hot vocabularies generated by the information on that day is quite high, which will be further explained by data analysis in the succeeding Table 7.

Regarding the extraction of the hot words, count the word frequency firstly and calculate the values of tf and idf. According to the obtained tf*idf characteristics, extract the words with the specified characteristics in advance. There is a comparison process between the words obtained in the previous step and the keywords we provided, to verify the effect of the keywords extracted in previous period.

Data given in the Table 6 are obtained after the automatic extraction of the keywords by means of tf*idf values.

TABLE 6 tf*idf values of some keywords between Aug. 1 and Aug. 16, 2004

| | Iraq | explosion | American troops | education | bank | ... | Olympic Games | terror | resources | Taiwan |
|---|---|---|---|---|---|---|---|---|---|---|
| 20040801 | .0151 | .0070 | .0051 | .0023 | .0005 | ... | .0007 | .0018 | .0016 | .0008 |
| 20040802 | .0080 | .0032 | .0035 | .0030 | .0040 | ... | .0011 | .0023 | .0023 | .0057 |
| 20040803 | .0041 | .0005 | .0043 | .0030 | .0007 | ... | .0008 | .0024 | .0018 | .0055 |
| 20040804 | .0079 | .0018 | .0019 | .0049 | .0046 | ... | .0095 | .0015 | .0044 | .0059 |
| 20040805 | .0033 | .0012 | .0018 | .0020 | .0007 | ... | .0041 | .0025 | .0028 | .0016 |
| 20040806 | .0050 | .0011 | .0019 | .0035 | .0007 | ... | .0020 | .0082 | .0022 | .0038 |
| 20040807 | .0102 | .0025 | .0050 | .0054 | .0054 | ... | .0017 | .0023 | .0014 | .0042 |
| 20040808 | .0105 | .0017 | .0031 | .0016 | .0019 | ... | .0016 | .0040 | .0012 | .0047 |
| 20040809 | .0067 | .0024 | .0031 | .0042 | .0012 | ... | .0200 | .0032 | .0041 | .0026 |
| 20040810 | .0049 | .0024 | .0017 | .0052 | .0011 | ... | .0070 | .0019 | .0020 | .0067 |
| 20040811 | .0037 | .0020 | .0023 | .0035 | .0016 | ... | .0034 | .0017 | .0021 | .0047 |
| 20040812 | .0078 | .0009 | .0065 | .0043 | .0005 | ... | .0067 | .0029 | .0018 | .0071 |
| 20040813 | .0046 | .0025 | .0018 | .0034 | .0079 | ... | .0109 | .0032 | .0016 | .0071 |
| 20040814 | .0040 | .0012 | .0035 | .0021 | .0012 | ... | .0097 | .0025 | .0017 | .0004 |
| 20040815 | .0092 | .0012 | .0048 | .0027 | .0020 | ... | .0075 | .0029 | .0005 | .0023 |
| 20040816 | .0157 | .0128 | .0086 | .0059 | .0041 | ... | .0055 | .0014 | .0060 | .0049 |

You can see that, the level of heat of the keywords cannot be explained fully by the tf*idf values during the selection course of the keywords. Take the tf*idf value of the keywords on Aug. 16, 2004 in the Table 7 as an example. You can see from the comparison of the abnormal level in the Table 5 that, the abnormal level of the "Olympic Games" 99 is the largest on that day, while its tf*idf value 0.0041 is after that of several words.

Detect and extract the hot words by the method stated in this invention in the following approaches and obtain the extraction effect given in the Table 7.

TABLE 7

Results of extraction of hot words based on statistic abnormal level

| One-day | Average accuracy | Average recall rate |
|---|---|---|
| 20040801 | 0.686641536 | 0.465080343 |
| 20040802 | 0.692661 | 0.402397086 |
| 20040803 | 0.6220188 | 0.481478064 |
| 20040804 | 0.7518346 | 0.58748368 |
| 20040805 | 0.7926606 | 0.52531332 |
| 20040806 | 0.8825684 | 0.567693 |
| 20040807 | 0.81027584 | 0.63876715 |
| 20040808 | 0.7750464 | 0.599780186 |
| 20040809 | 0.83807388 | 0.67579401 |
| 20040810 | 0.85889964 | 0.701615432 |
| 20040811 | 0.81146836 | 0.645256038 |
| 20040812 | 0.8091744 | 0.630898944 |
| 20040813 | 0.85577976 | 0.698546352 |
| 20040814 | 0.7513766 | 0.685936876 |
| 20040815 | 0.75486213 | 0.66625091 |
| 20040816 | 0.80788981 | 0.72581074 |

The extraction of the hot words is within the selection scope based on the previous tf*idf values. Order the words by their importance in accordance to the historical averages and variances of the word frequency. Select the final hot word according to the mechanism of the abnormal level grade. Since no keywords are given in the documents obtained online, and no existing objective standards can be used for comparison, we establish a dictionary for the hot keywords manually to verify this invention and then compare with the extracted words.

For the hot words acquired through the method of this invention, namely keywords with large abnormal level after detection, their precision ratio and recall rate to the documents are given in the Table 7. The detection method for the hot words, established on the basis of keywords extraction, is the discovery of the hot words in the keywords. Therefore, the all sidedness of the keywords extraction will affect the discovery of the hot words. During the effect verification process of this invention, a word is of higher abnormal level in a certain period of time. In case that the abnormal level remains high, there is a strong progressive increase process for the growth of the word frequency. Fluctuation of the word frequency is embodied by the tf*idf in the Table 6; meanwhile, during a certain period of time, the abnormal level of a certain is lower all the time, but begins to move up after a significant fluctuation (such as "Olympic Games"; using August 13 as the demarcation line, the abnormal level before which is not very high, under 5.0, but begins to move up, above 90); in the meanwhile, the abnormal level is quite high in the beginning, and reduces with the lapse of time afterwards (such as "Iraq"; in the initial stage of the test data, its average abnormal level is 83.7 from August 6 to August 9, and becomes less than 10 gradually). The tendency for the abnormal level of some words is given in the Table 5.

It can be seen that, the Precision of the hot words extraction involved in the Table 7 is high. Since the historical data fluctuation is not taken into consideration, the Precision of the data on the initial day is low, and the historical fluctuations on the second and third days are not obvious. With the reference and correction of the historical fluctuations, the Precision of the data on the next few days is above 70%, with the highest 89% (the average is 78.13%), which most hot words extracted by the method in this invention are in accordance to the words in the hot words, with precise extraction result.

In Table 7, the Recall shows the proportion between the words discovered by means of the method in this invention and the hot words. The evaluation dictionary of the hot words provided by this invention is generated manually. The dictionary is different every day and number of words varies, which are obtained in accordance to the online information on that day or the other day. Because of the limited samples involved in the extraction of the information, in addition the few words selected according to the tf*idf values in the automatic selection of the keywords, the Recall in the verification is not very high (average is 60.61%). The inadequacy can be improved by means of enlarging sample aggregation and increasing the number of the automatic selective keywords. It is just simple effect verification here. The number of samples in the actual application is far great than the test aggregation here and the keywords will be not confined to 10 words extracted according to the tf*idf values during implementation. Enlarge the scope as per actual requirements so as not to miss the words that are of low tf*idf values but likely to be hot words. The Recall can be promoted accordingly by means of actual application of large-scale data set and a great deal of keywords extraction.

According to our method, to evaluate the effect of the hot words detected. The general comparison made according to the Precision and Recall in Table 7 can serve as the objective reference data for the evaluation of hot words. The grade precision is evaluated comprehensively by the two index values. It is learned that there is no similar method for the detection of Chinese hot words up to now; therefore, this invention is of originality. Our evaluation for the two index values here shall be carried out in the patent effect itself. Check the changes in Precision and Recall from August 1 to 16; we can see that, they are not high on the initial day and of great difference (Precision 68% and Recall 46%). On the succeeding days, both of them go up through make comparison with the manual hot words and integration of the fluctuation of historical word frequency. Take the hot words on August 13-16 as an example. Based on the historical fluctuation, the growth of the word frequency for "Olympic Games" is estimated well, and the prewarning reminder is done correctly. For the other hot words during this time period, the average Precision is 79.2%, while Recall 69.4%. The consideration of the accumulation of the historical fluctuation has some effect on the evaluation index values.

During the effect evaluation process of this invention, the hot words generated from human subjective commonsense mainly are used as standard, which may have influence on the objectivity of evaluation effect in a certain degree. However, as there are no available standard for Chinese hot words so that labor standard can only be adopted for comparison temporarily. In terms of the important event in a certain field, the hot words we selected are based on the information from main portal websites, thus, they are much subjective and can be used as the reference of actual applications in terms of the goal.

Further, we compared the hot words extracted within a period of time with the focal events collected and summarized on a certain search website during a time period—in weeks—(two weeks from Aug. 1 to 16, 2004). Refer to the Table 8 for the comparison result.

TABLE 8

Hot words for the focal events obtained by this invention and some search engine

| Classification | Accumulation of hot words obtained by this invention | Keywords for the focal events obtained by search engine | Accumulation of standard words |
|---|---|---|---|
| Time period | 20040801-20040816 20040801-20040816 | 20040801-20040816 20040801-20040816 | 20040801-20040816 20040801-20040816 |
| Word examples | Olympic Games, real estate, exchange rate, Iraq, RMB, share reform, inflation, the World Cup, terror, Palestine, Taiwan, education, bank, match, explosion, China team, etc. | Match, Greece, China team, Olympic Games, gold medal, Iraq, American troops, terror, Gaza, Telecom, Najaf, Olympic, education, Palestine, aid, resource, navigation, opening ceremony, enrollment, film, RMB. suspension sanction, record, stadium, etc. | Taiwan, plane, Iraq, American troops, match, China team, Olympic Games, education, navigation, terror, stadium, Najaf, navy, Olympic Committee, U.N., Greece, Afghanistan, war, resource, arms, gold medal, nuke, film, foods, petroleum, Hollywood, city planning, etc. |
| Total words | 160 160 | 196 196 | 210 210 |
| Words satisfying the standard | 125 125 | 138 138 | — — |
| Average recall rate | 0.59524 0.59524 | 0.65714 0.65714 | — — |
| Average precision ratio | 0.78125 0.78125 | 0.70408 0.70408 | — — |

As the collected information in the search engine is presented in the form of title, only those happened in a period of time are listed, and there are no concrete events happened on a certain day, we contracted the keywords aiming at these events and listed the hot words information in this period through our method. Make a comparison with the standard of the accumulated hot word generated manually according to the style defined before, we can see through the calculation that the average Precision in this period of time for search engine is 69.72% and the average Recall is 63.3%; correspondingly, the average Precision and Recall are 73.75% and 56.19% separately for the statistic result in a certain period of time with our method. From the above two index values, we can see that the average Recall of this method in this test is inferior to that of search engine, but the Precision remains one step ahead, which may be influenced by the labor standard hot vocabulary, however, the difference is not very great.

From the comparison of data in Table 8, it is seen that this invention is of superior average Precision. The main reason is that it well focuses on the characteristic of "backtracking sudden increase of hot words at a specific time point compared with self-history". Meanwhile, this invention is characterized by a much lower average Recall, which explains that there are some features of hot words haven't been covered by this invention. To sum up, this invention is applicable to those users who are picky about the accuracy of results and satisfied with discovering most hot words, but don't mind some specific hot words that are not discovered, such as government leaders who don't have much time and venture capitalists, etc.

What is claimed is:

1. A method for monitoring abnormal state of Internet information based on a dictionary of hot words that users have interest in, the method comprising:

1) obtaining and storing current date word-frequency data of common words appearing in current date web pages in a database, wherein the step of obtaining includes:

(1.1) determining a list of websites to be mined;

(1.2) in each of the websites in the list, obtaining an occurrence frequency for each of the common words based on following steps:

obtaining chained addresses of web pages associated with the websites according to the common words associated with the websites;

selecting information concerning each of the common words marked with current date information based on the chained addresses of the web pages; and counting the information;

(1.3) accumulating occurrence frequency of each common word in the websites to obtain the current date word-frequency data associated with the common words;

2) combining with the dictionary of hot words that the users focus on to determine current date keywords of each of the web pages, and merging the current date keywords associated with the web pages to obtain a list of the current date keywords of the Internet information {ti, i=1 ... M}, wherein M is number of the current date keywords in the list of current date keywords;

3) determining a weight for each current date keyword by a computer system, comprising:

calculating a historical average $\mu i$ and a historical fluctuation rate $\sigma i$ according to historical word-frequency data of said each current date keyword in Internet, wherein the historical fluctuation rate is defined as an absolute value of word-frequency variation rate; and defining $q_i = 1/(cein(\sigma_i))$, wherein cein( ) is a round-up function, a weight $w_i$ of a keyword $t_i$ satisfies:

$$w_i = q_i \bigg/ \sum_{i=1}^{M} q_i,$$

wherein i=1 corresponds to the current date keyword with lowest current date word-frequency fi;

4) determining an abnormal threshold of the current date keywords by the computer system:

for a current date keyword $t_i$, defining an abnormal threshold value as $\sigma_i' = \sigma_i + c\,(w_i/w_1)$, wherein c is a constant representing expansion of abnormal threshold, which is defined by the users according to the users' experiences; and 5) detecting an abnormal level of the current date keywords to determine current date hot Internet information, which comprises:

defining an offset degree of said each current date keyword as $\theta_i' = (f_i - \mu_i)/\sigma_i'$; and assigning the Internet information containing the current date keywords with larger offset degree to be the current date hot Internet information.

2. The method of claim 1, wherein the current date keywords of each of the web pages are determined by:

(2.1) for each of the common words in each of the web pages, calculating an information characteristic value (tfidf) as tfidf=−[freq(p,D)/size(D)]*[log(df(p)/N)], wherein freq(p,D) is number of common words p in web page D, size(D) is number of all common words contained in page D, df(p) is number of articles containing common word p in the current date web pages, and N is number of the current date web pages, and (2.2) comparing all common words in one of the web pages with the dictionary of hot words that the users focus on;

deleting hot words that are beyond the users' focus to form an alternative keyword list specifically for the one of the web pages; and choosing a number K of keywords with greater tfidf in the alternative keyword list to obtain the current date keywords of the one of the web pages, where K is a positive integer.

3. The method of claim 1, further comprising:

defining abnormal level $\theta_i$ of each of the current date keywords, $\theta_i=0$ when $-\infty<\theta_i'<0$; $\theta_i=$floor($10\theta_i'$) when $0\leq\theta_i'<1$, where floor( ) is a round-down function; when $1\leq\theta_i'<2$, $\theta_i=$floor($80(\theta_i'-1)$)+10; when $2\leq\theta_i'<3$, $\theta_i=$floor($9(\theta_i'-2)$)+90; when $3\leq\theta_i'<+\infty$, $\theta_i=99$; when the abnormal level $\theta_i$ of the keyword $t_i$ is greater than 90, an abnormal change is considered to have occurred in the keyword $t_i$; and identifying the Internet information containing the keyword $t_i$ as an emergency hot-issue information.

4. The method of claim 3, further comprising:

displaying the abnormal levels of the current date keywords.

5. The method of claim 3 or 4, further comprising:

alerting alarming the users when the abnormal level $\theta_i$ of current date keyword $t_i$ is greater than 90.

* * * * *